US012670035B1

(12) United States Patent
Saini et al.

(10) Patent No.: US 12,670,035 B1
(45) Date of Patent: Jun. 30, 2026

(54) REMOTELY MANAGING EXECUTION OF CONTAINERIZED APPLICATIONS ACROSS USER-MANAGED AND SERVER-MANAGED DATA CENTERS

(71) Applicant: Amazon Technologies, Inc., Seattle, WA (US)

(72) Inventors: Milan Saini, West New York, NJ (US); Anoop Kapoor, Seattle, WA (US); Christina Anne Larsen, Burien, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1057 days.

(21) Appl. No.: 17/119,578

(22) Filed: Dec. 11, 2020

(51) Int. Cl.
| | |
|---|---|
| *G06F 9/46* | (2006.01) |
| *G06F 9/455* | (2018.01) |
| *G06F 9/48* | (2006.01) |
| *G06F 9/50* | (2006.01) |
| *H04L 41/5051* | (2022.01) |
| *H04L 67/10* | (2022.01) |

(52) U.S. Cl.
CPC ........ *G06F 9/5077* (2013.01); *G06F 9/45558* (2013.01); *G06F 9/4881* (2013.01); *G06F 9/5072* (2013.01); *H04L 41/5051* (2013.01); *H04L 67/10* (2013.01); *G06F 2209/5015* (2013.01); *G06F 2209/505* (2013.01); *G06F 2209/506* (2013.01); *G06F 2209/509* (2013.01)

(58) Field of Classification Search
None
See application file for complete search history.

(56) References Cited

U.S. PATENT DOCUMENTS

| | | |
|---|---|---|
| 7,844,480 B2 | 11/2010 | Ricketts |
| 8,898,402 B1 | 11/2014 | Stronge |
| 9,110,496 B1 | 8/2015 | Michelsen |
| 9,152,441 B2 | 10/2015 | Anderson |
| 9,164,802 B2 | 10/2015 | Netto |

(Continued)

OTHER PUBLICATIONS

U.S. Appl. No. 16/217,454, filed Dec. 12, 2018, Aithal et al.

(Continued)

*Primary Examiner* — Bing Zhao
(74) *Attorney, Agent, or Firm* — Knobbe, Martens, Olson & Bear, LLP

(57) ABSTRACT

Generally described, the present application relates to providing a container orchestration service that can enable and manage execution of containerized applications on user-owned infrastructure and cloud-provided compute capacity. In some embodiments, a request to execute a task may indicate the type of compute capacity (e.g., internal/external, computing resource amount, etc.) to be used to execute the task. For example, if the task indicates that internal compute capacity is to be used, compute capacity hosted the cloud provider network can be identified and used to execute the task. Alternatively, if the task indicates that external compute capacity is to be used, instructions for executing the task can be generated and sent to the user-owned infrastructure, and the task can be executed using compute capacity provided within the user-owned infrastructure, which is external to the cloud provider network implementing the container orchestration service.

25 Claims, 6 Drawing Sheets

(56) References Cited

U.S. PATENT DOCUMENTS

| | | | |
|---|---|---|---|
| 9,256,467 B1 | 2/2016 | Singh et al. | |
| 9,549,038 B1 | 1/2017 | Anne | |
| 9,667,498 B2 | 5/2017 | Wu et al. | |
| 9,690,622 B1 | 6/2017 | Argenti et al. | |
| 9,848,041 B2 | 12/2017 | Einkauf et al. | |
| 9,898,347 B1 | 2/2018 | Gupta | |
| 9,910,713 B2 | 3/2018 | Wisniewski et al. | |
| 9,928,108 B1 | 3/2018 | Wagner et al. | |
| 9,971,621 B1 | 5/2018 | Berg et al. | |
| 9,983,796 B2 | 5/2018 | Yang et al. | |
| 10,002,026 B1 | 6/2018 | Wagner | |
| 10,067,785 B1 | 9/2018 | Wei et al. | |
| 10,067,801 B1 | 9/2018 | Wagner | |
| 10,135,712 B2 | 11/2018 | Wu et al. | |
| 10,191,778 B1 | 1/2019 | Yang et al. | |
| 10,310,966 B1 | 6/2019 | Ge et al. | |
| 10,397,255 B1 | 8/2019 | Bhalotra et al. | |
| 10,432,551 B1 | 10/2019 | Vosshall et al. | |
| 10,581,964 B2 | 3/2020 | Einkauf et al. | |
| 10,606,646 B1 | 3/2020 | Christensen | |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 10,901,764 B2 | 1/2021 | Tegtmeier et al. | |
| 11,263,034 B2 | 3/2022 | Wagner et al. | |
| 11,288,091 B2 | 3/2022 | Laschinger et al. | |
| 11,385,938 B2 | 7/2022 | Kim | |
| 11,392,422 B1 | 7/2022 | Filiz et al. | |
| 11,403,150 B1 | 8/2022 | Featonby et al. | |
| 11,422,844 B1 | 8/2022 | Filiz et al. | |
| 11,449,355 B2 | 9/2022 | Jin et al. | |
| 11,487,591 B1 | 11/2022 | Featonby | |
| 11,573,816 B1 | 2/2023 | Featonby et al. | |
| 11,762,706 B1 | 9/2023 | Jarvis et al. | |
| 11,797,287 B1 | 10/2023 | Ghai et al. | |
| 11,853,807 B1 | 12/2023 | Coult et al. | |
| 11,892,418 B1 | 2/2024 | Featonby et al. | |
| 11,989,586 B1 | 5/2024 | Srikanta et al. | |
| 11,995,466 B1 | 5/2024 | Srikanta et al. | |
| 12,190,144 B1 | 1/2025 | Featonby et al. | |
| 2005/0002375 A1 | 1/2005 | Gokhale et al. | |
| 2008/0282267 A1 | 11/2008 | Adam et al. | |
| 2011/0246515 A1 | 10/2011 | Johnson et al. | |
| 2012/0179824 A1* | 7/2012 | Jackson | H04L 47/827 709/226 |
| 2012/0210326 A1 | 8/2012 | Torr et al. | |
| 2012/0233668 A1 | 9/2012 | Leafe et al. | |
| 2013/0124807 A1 | 5/2013 | Nielsen et al. | |
| 2013/0160008 A1 | 6/2013 | Cawlfield et al. | |
| 2013/0238785 A1 | 9/2013 | Hawk et al. | |
| 2013/0297964 A1 | 11/2013 | Hegdal et al. | |
| 2013/0318132 A1 | 11/2013 | Basu et al. | |
| 2014/0079207 A1 | 3/2014 | Zhakov et al. | |
| 2014/0358710 A1 | 12/2014 | Balestrieri et al. | |
| 2014/0366093 A1 | 12/2014 | Oh et al. | |
| 2015/0106805 A1 | 4/2015 | Melander et al. | |
| 2015/0142878 A1 | 5/2015 | Hebert et al. | |
| 2016/0077846 A1 | 3/2016 | Phillips et al. | |
| 2016/0112497 A1 | 4/2016 | Koushik et al. | |
| 2016/0274928 A1 | 9/2016 | Linton et al. | |
| 2016/0323377 A1 | 11/2016 | Einkauf et al. | |
| 2016/0378559 A1 | 12/2016 | Bhandarkar et al. | |
| 2017/0060621 A1* | 3/2017 | Whipple | G06F 9/5072 |
| 2017/0063659 A1 | 3/2017 | Platon et al. | |
| 2017/0078433 A1 | 3/2017 | Radhakrishnan et al. | |
| 2017/0090960 A1 | 3/2017 | Anderson et al. | |
| 2017/0090961 A1 | 3/2017 | Wagner et al. | |
| 2017/0115978 A1 | 4/2017 | Modi et al. | |
| 2017/0140526 A1 | 5/2017 | Chen et al. | |
| 2017/0177413 A1 | 6/2017 | Wisniewski et al. | |
| 2017/0177860 A1 | 6/2017 | Suarez et al. | |
| 2017/0177877 A1 | 6/2017 | Suarez et al. | |
| 2017/0180346 A1 | 6/2017 | Suarez et al. | |
| 2017/0339158 A1 | 11/2017 | Lewis et al. | |
| 2017/0339196 A1 | 11/2017 | Lewis et al. | |
| 2017/0371703 A1 | 12/2017 | Wagner et al. | |
| 2017/0372703 A1 | 12/2017 | Sung et al. | |
| 2018/0004503 A1 | 1/2018 | Olmstedthompson | |
| 2018/0060133 A1 | 3/2018 | Fang et al. | |
| 2018/0088993 A1 | 3/2018 | Gerdesmeier et al. | |
| 2018/0101403 A1 | 4/2018 | Baldini et al. | |
| 2018/0129539 A1 | 5/2018 | Sadat | |
| 2018/0150325 A1 | 5/2018 | Kuo et al. | |
| 2018/0246745 A1 | 8/2018 | Aronovich et al. | |
| 2018/0267990 A1 | 9/2018 | Cherukuri et al. | |
| 2018/0278639 A1 | 9/2018 | Bernstein et al. | |
| 2018/0285204 A1 | 10/2018 | Dwarampudi et al. | |
| 2018/0331971 A1 | 11/2018 | Certain et al. | |
| 2018/0336345 A1 | 11/2018 | Georgiev | |
| 2019/0050680 A1 | 2/2019 | Waugh et al. | |
| 2019/0079788 A1 | 3/2019 | Ruty et al. | |
| 2019/0102231 A1 | 4/2019 | Wagner | |
| 2019/0108049 A1 | 4/2019 | Singh et al. | |
| 2019/0146772 A1 | 5/2019 | Griffin et al. | |
| 2019/0146774 A1 | 5/2019 | Moore et al. | |
| 2019/0149406 A1 | 5/2019 | Fratini | |
| 2019/0188107 A1 | 6/2019 | Alston et al. | |
| 2019/0243681 A1 | 8/2019 | Chen | |
| 2019/0294477 A1 | 9/2019 | Koppes et al. | |
| 2019/0303274 A1 | 10/2019 | Funnell et al. | |
| 2019/0324786 A1 | 10/2019 | Ranjan et al. | |
| 2019/0340033 A1 | 11/2019 | Ganteaume | |
| 2019/0342266 A1 | 11/2019 | Ramachandran et al. | |
| 2019/0347127 A1 | 11/2019 | Coady et al. | |
| 2019/0391834 A1 | 12/2019 | Mullen et al. | |
| 2019/0392045 A1 | 12/2019 | De et al. | |
| 2020/0051017 A1 | 2/2020 | Dujmic | |
| 2020/0073649 A1 | 3/2020 | Viana et al. | |
| 2020/0084202 A1 | 3/2020 | Smith et al. | |
| 2020/0133718 A1 | 4/2020 | Koehler et al. | |
| 2020/0142711 A1 | 5/2020 | Varda et al. | |
| 2020/0174842 A1 | 6/2020 | Wang et al. | |
| 2020/0174844 A1 | 6/2020 | Bergsma et al. | |
| 2020/0210227 A1 | 7/2020 | Xie et al. | |
| 2020/0213279 A1 | 7/2020 | Xiong et al. | |
| 2020/0225983 A1* | 7/2020 | Jung | G06F 9/5027 |
| 2020/0241930 A1 | 7/2020 | Garg et al. | |
| 2020/0249977 A1 | 8/2020 | Mentz et al. | |
| 2020/0310845 A1 | 10/2020 | Liguori et al. | |
| 2020/0310850 A1 | 10/2020 | Liguori et al. | |
| 2020/0356387 A1 | 11/2020 | Anwar et al. | |
| 2020/0358719 A1 | 11/2020 | Mestery et al. | |
| 2020/0412596 A1 | 12/2020 | Cherunni | |
| 2021/0019179 A1 | 1/2021 | Yadav et al. | |
| 2021/0064442 A1 | 3/2021 | Alluboyina et al. | |
| 2021/0089361 A1 | 3/2021 | Rafey et al. | |
| 2021/0109775 A1 | 4/2021 | Shen et al. | |
| 2021/0117217 A1 | 4/2021 | Croteau et al. | |
| 2021/0141655 A1 | 5/2021 | Gamage et al. | |
| 2021/0144517 A1 | 5/2021 | Guim et al. | |
| 2021/0158083 A1 | 5/2021 | Gan et al. | |
| 2021/0160162 A1 | 5/2021 | Abbas | |
| 2021/0184942 A1 | 6/2021 | Tootaghaj et al. | |
| 2021/0191748 A1 | 6/2021 | Ito | |
| 2021/0232344 A1 | 7/2021 | Corrie | |
| 2021/0311764 A1 | 10/2021 | Rosoff et al. | |
| 2021/0357255 A1 | 11/2021 | Mahadik et al. | |
| 2022/0035646 A1 | 2/2022 | Ibryam | |
| 2022/0188167 A1 | 6/2022 | Iyer et al. | |
| 2022/0229651 A1 | 7/2022 | Wu et al. | |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Chavan, et al., "Clustered Virtual Machines for Higher Availability of Resources with Improved Scalability in Cloud Computing," 2014 IEEE, pp. 221-225.
Chen, et al., "Virtual Cluster: Customizing the Cluster Environment through Virtual Machines," 2008 IEEE, pp. 411-416.

(56)          References Cited

OTHER PUBLICATIONS

Dettori, "Blueprint for Business Middleware as a Managed Cloud Service", IEEE International Conference on Cloud Engineering, 2014, pp. 261-270.
Sharifi et al. "VCE: A New Personated Virtual Cluster Engine for Cluster Computing", 2008 IEEE, 6 pages.

* cited by examiner

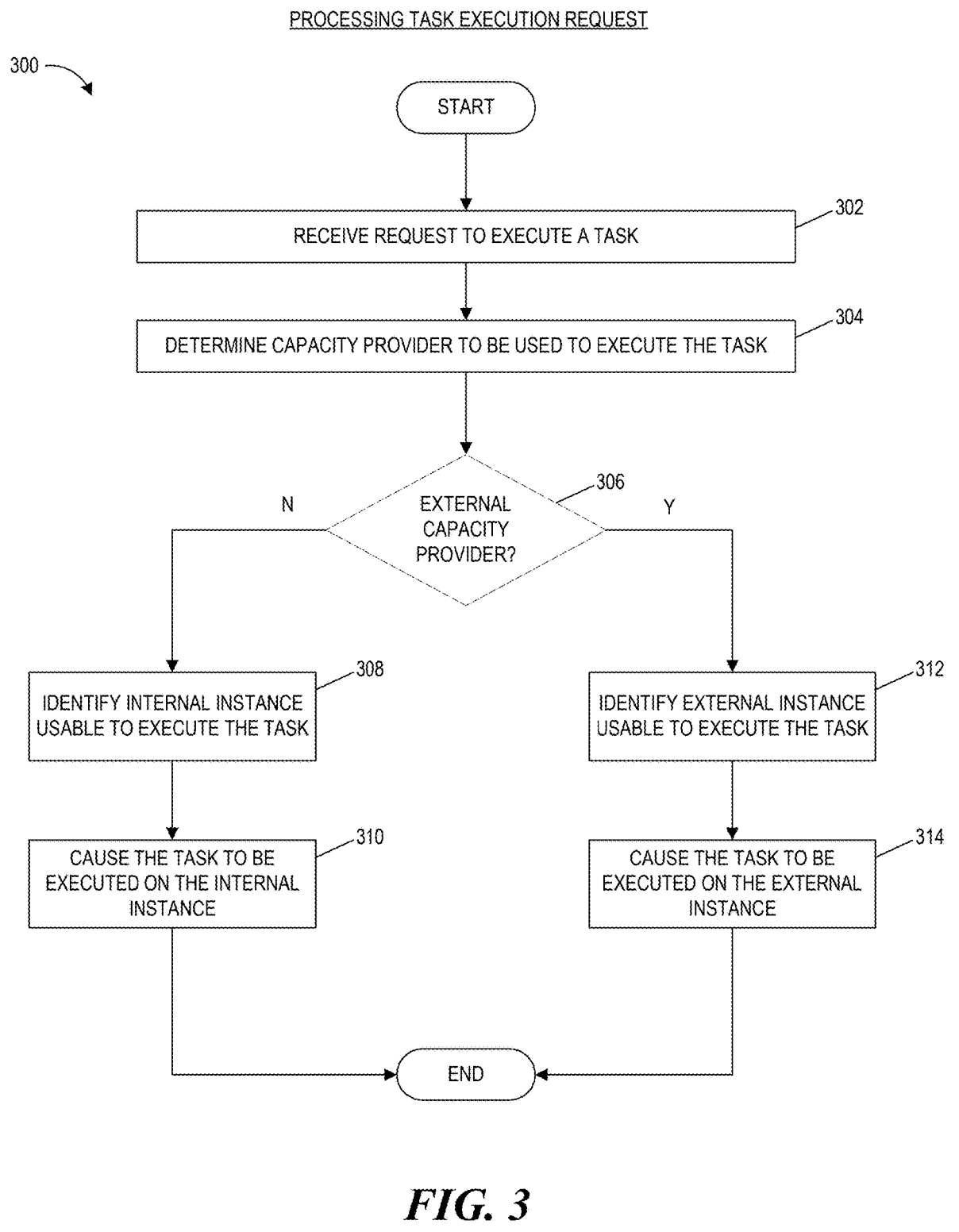

PROCESSING TASK EXECUTION REQUEST

300

START

RECEIVE REQUEST TO EXECUTE A TASK — 302

DETERMINE CAPACITY PROVIDER TO BE USED TO EXECUTE THE TASK — 304

306

EXTERNAL CAPACITY PROVIDER?

N

Y

IDENTIFY INTERNAL INSTANCE USABLE TO EXECUTE THE TASK — 308

IDENTIFY EXTERNAL INSTANCE USABLE TO EXECUTE THE TASK — 312

CAUSE THE TASK TO BE EXECUTED ON THE INTERNAL INSTANCE — 310

CAUSE THE TASK TO BE EXECUTED ON THE EXTERNAL INSTANCE — 314

END

*FIG. 3*

TRANSITIONING FROM EXTERNAL COMPUTE CAPACITY TO INTERNAL COMPUTE CAPACITY

400

START

CAUSE TASK(S) TO BE EXECUTED USING EXTERNAL COMPUTE CAPACITY — 402

MONITOR TASK EXECUTIONS THAT USE EXTERNAL COMPUTE CAPACITY — 404

RECEIVE REQUEST TO EXECUTE TASK(S) — 406

THRESHOLD REACHED FOR EXTERNAL COMPUTE CAPACITY? — 408

N

Y

CAUSE TASK(S) TO BE EXECUTED USING INTERNAL COMPUTE CAPACITY — 410

END

DISTRIBUTING TASKS ACROSS INTERNAL AND EXTERNAL COMPUTE CAPACITY

REMOTELY MANAGING EXECUTION OF CONTAINERIZED APPLICATIONS ACROSS USER-MANAGED AND SERVER-MANAGED DATA CENTERS

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

BRIEF DESCRIPTION OF THE DRAWINGS

FIG. 3 is a flowchart of an example process for processing a task execution request in accordance with aspects of the present disclosure.

DETAILED DESCRIPTION

Introduction

Figure 1:
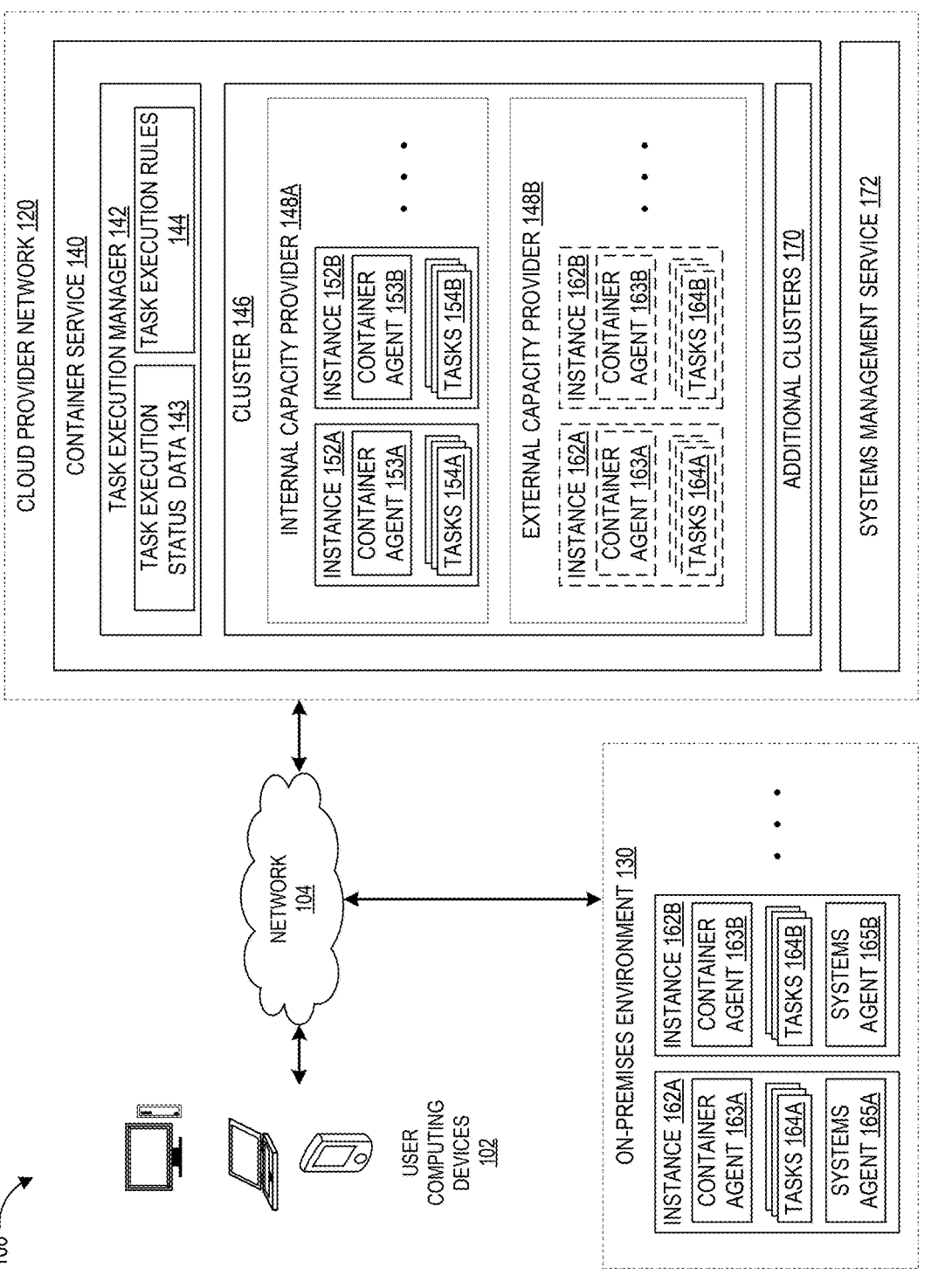
FIG. 1 depicts a schematic diagram of a network environment in which a cloud provider network is used to implement a container service and a task execution manager in accordance with aspects of the present disclosure.

The present disclosure generally relates to providing an orchestration service for remotely managing execution of containerized applications on user-managed infrastructure. Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can be hosted on or across a set of physical machines, which may include a single physical machine or multiple physical machines, in a distributed computing environment such as a cloud provider network.

A developer can package a software application and everything else needed to run the application in a container image (e.g., a standalone, executable package of software that includes everything needed to run an application process) and send a request to the cloud provider network to execute the application in a cluster. In the request, the developer may indicate any information needed to execute the application in the cluster. In response, the cloud provider network may utilize the compute capacity in the cluster to execute the application.

In some cases, however, a user may have already invested a significant amount of resources in setting up her own infrastructure for providing compute capacity, for example, by acquiring and configuring locally networked computer servers with storage and processing power that can be used to run software applications. In other cases, her enterprise may operate in a highly regulated industry that requires her to own and operate the underlying infrastructure used for executing certain software applications. In these cases, she may wish to use the compute capacity provided by her own servers, rather than the compute capacity provided by the cloud provider network. To do so, she may download and set up her own container orchestration software that can manage execution of containerized applications on her local servers. If her local servers are at full capacity but she wishes to run additional applications, she may do so by sending a request to the cloud provider network, which can then acquire compute capacity on behalf of the user and run those applications using the computing resources provided within the cloud provider network.

However, keeping track of applications running on two separate environments in such a manner may be cumbersome and inefficient for the user. For example, she would need to figure out which applications to run on the respective environments, and send separate requests to the orchestrators (e.g., some to the orchestration software managing her local servers, and some to the cloud provider network) using two different sets of APIs.

The aforementioned challenges, among others, is addressed in some embodiments by the disclosed techniques for providing an orchestration service that can manage execution of containerized applications on both user-owned infrastructure and cloud-provided compute capacity. More specifically, the presently disclosed technology addresses these deficiencies by establishing a communication channel between the execution manager (e.g., a component that manages execution of containerized applications) on the cloud provider network and the compute capacity provided by user-owned infrastructure, so that the information usable to manage the execution of applications on the user-owned infrastructure can be sent to the execution manager via the communication channel, allowing the execution manager to not only manage the execution of applications on the compute capacity within the cloud provider network, but also remotely manage the execution of applications on the user-owned infrastructure.

By allowing code executions on multiple types of compute capacity to be managed by a single component regardless of whether the compute capacity is located within the cloud provider network or within the user's on-premises environment, the presently disclosed technology can reduce operational overhead (e.g., relative to the scenario where the user manages the different environment separately) and provide uniformity across all environments (e.g., by allowing the user to use a single set of APIs for all environments), thereby providing an improved and more efficient code execution experience to the user.

As will be appreciated by one of skill in the art in light of the present disclosure, the embodiments disclosed herein improve the ability of computing systems, such as container systems and code execution systems, to provide more efficient management of code executions across multiple environments having different types of compute capacity. By establishing a communication channel between the cloud provider network control plane and the compute capacity within the user-owned infrastructure, the cloud provider network of the present disclosure can address the deficiencies described above.

Prior techniques for running containerized applications on user-owned hardware generally involved installing a container orchestration software application on the user-owned hardware and using the container orchestration software application to manage the code executions on the user-owned hardware. If the user wished to also execute applications on the cloud provider network, management of such executions was performed entirely separately by the cloud provider network, without any exchange of information between the cloud provider network and the user-owned hardware. However, such approaches would require the user to maintain two separate environments using two separate orchestrators and commands, which may be cumbersome and inefficient. In contrast, embodiments of the present disclosure enable a single execution manager of the cloud provider network to manage not only code executions within the cloud provider network but also those performed in the user's on-premises environment using user-owned infrastructure, thereby reducing operational overhead and providing uniformity across all environments (e.g., same control plane, same APIs, etc.).

The presently disclosed embodiments therefore address technical problems inherent within computing systems, such as the complexities that arise from having to separately manage multiple sources of compute capacity. These technical problems are addressed by the various technical solutions described herein, including providing a mechanism for allowing the execution manager on the cloud provider network to obtain information from the user-owned infrastructure and to manage the execution of software applications on the user-owned infrastructure. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service

FIG. 1 depicts an example computing environment 100 including a cloud provider network 120 in which the disclosed container service and task execution manager can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for managing task executions across internal and external compute capacity may be implemented in non-clastic computing environments as well.

The cloud provider network 120 can be accessed by user computing devices 102 over a network 104. The cloud provider network 120 may include a container service 140 (referred to in various implementations as a container service, cloud container service, container engine, or container cloud service), a systems management service 172, and one or more other services not illustrated in FIG. 1 that are in networked communication with one another and with the network 104 to provide users with access to the services and resources provided by the cloud provider network 120.

FIG. 1 also illustrates an on-premises environment 130 that is in communication with the user computing devices 102 and the cloud provider network 120 via the network 104. The on-premises environment 130 may include physical hardware owned and/or operated by a user of the cloud provider network 120 but separate and remote from the physical hardware implementing the cloud provider network 120 or any components thereof. As shown in FIG. 1, physical or virtual compute instances in the on-premises environment 130 can be configured to communicate with the container service 140 such that task executions on such physical or virtual compute instances can be managed by the container service 140.

In the example of FIG. 1, the container service 140 provides a task execution manager 142, a cluster 146, and additional clusters 170. The task execution manager 142 manages the execution of tasks in the clusters 146 and 170, which may include routing the task execution requests to the appropriate compute capacity according to the instructions provided in the requests and/or according to task execution rules associated with the requests, and monitoring the task executions performed using the compute capacity.

The task execution manager 142 may route the incoming task execution requests based on task execution status data 143 and/or task execution rules 144. The task execution status data 143 may indicate the health of the compute instances in the cluster, the available computing resources of the compute instances in the cluster, and the like. The task execution rules 144 may include rules according to which incoming task execution requests should be routed to one of the capacity providers in the cluster. For example, a task execution rule associated with a request and/or the cluster may indicate that the first 50 tasks should be sent to the external compute instances in the cluster, and any subsequent tasks should be sent to the internal compute instances in the cluster. The user associated with the cluster may be able to create, modify, and delete the task execution rules 144 using APIs provided by the container service 140.

The cluster 146 is associated with an internal capacity provider 148A and an external capacity provider 148B. Capacity providers determine the infrastructure that tasks in a cluster run on. One or more capacity providers are specified in a capacity provider strategy, which is then associated with a cluster. A capacity provider strategy determines how the tasks are spread across the cluster's capacity providers. When a user runs a task or creates a service, the user may either use the cluster's default capacity provider strategy or specify a capacity provider strategy that overrides the cluster's default strategy.

In the example of FIG. 1, the internal capacity provider 148A is configured to provide internal compute capacity usable to execute tasks that is hosted by a set of physical machines within the cloud provider network 120, and the external capacity provider 148B is configured to provide external compute capacity usable to execute tasks that is hosted by a set of physical machines outside the cloud provider network 120 (e.g., within the on-premises environment 130). For example, the external compute capacity in a cluster may include compute capacity implemented on infrastructure owned and/or operated by the user associated with the cluster. As used herein, the term "internal" refers to being implemented within the cloud provider network 120 and/or implemented on infrastructure managed by the cloud provider network 120 (e.g. "internal compute instances" or "internal compute capacity"), and the term "external" refers to being implemented outside the cloud provider network 120 and/or implemented on infrastructure managed by a third party other than the cloud provider network 120 itself, such as, for example, a customer or user of the cloud provider network 120. For example, internal compute capacity may refer to compute capacity that a user can access via a user account registered with the cloud provider network 120, and external compute capacity may refer to compute capacity that the user can access without having to access the cloud provider network and/or compute capacity that the user can access regardless of whether the user has a user account registered with the cloud provider network 120.

As shown in FIG. 1, the instances 152A and 152B have container agents 153A and 153B configured to perform operations on behalf of the instances 152A and 152B, respectively. The instances 152A and 152B also have tasks 154A and 154B executing thereon, respectively. The instances 162A and 162B have container agents 163A and 163B configured to perform operations on behalf of the instances 162A and 162B, respectively. The instances 162A and 162B also have tasks 164A and 164B executing thereon, respectively. In FIG. 1, the instances 162 are shown in dashed lines to indicate that these instances are implemented on infrastructure external to the cloud provider network 120. As shown in FIG. 1, the instances 162 are hosted by infrastructure provided within the on-premises environment 130 (and thus shown in solid lines). Additionally, the instances 162A and 162B include systems agents 165A and 165A configure to register the instances 162A and 162B with the cloud provider network 120 (for use by the container service 140). The systems agents 165 are configured to communicate with the systems management service 172 to provide status and execution information, provide credentials to the container agents 163, and authenticate the instances 162 to the container service 140. Further details regarding the systems management service 172 and the systems agents 165 can be found within U.S. Pat. No. 10,771,337, entitled "CONTROLLING PERMISSIONS FOR REMOTE MANAGEMENT OF COMPUTING RESOURCES" and filed May 25, 2018, the entirety of which is hereby incorporated by reference.

In some embodiments, the container agents 153 and container agents 163 are configured to perform execution of tasks in a manner identical to each other. In other embodiments, the container agents 153 and container agents 163 are configured to perform execution of tasks in different ways based on the container agents 153 being on internal compute instances, and the container agents 163 being on external compute instances. For example, the container agents 153 and 163 may set or access a flag that indicates whether the container agent is on an internal compute instance or an external compute instance. In some cases, the flag may be set based on user input. In such an example, using this flag, the container agent may be able to block calls from an external compute instance to access certain resources that are only available from within the cloud provider network 120 and redirect or reconfigure the calls as needed (e.g., to return an alternative response or to redirect the call to other resources in the on-premises environment).

Although FIG. 1 shows clusters 146 and 170, in other embodiments, any number of clusters (e.g., 0, 1, 2, 5, or 100) may be part of the container service 140 and/or managed by the task execution manager 142. Also, one or more compute instances may be added to or removed from the internal capacity providers 148A and 148B.

The container service 140 may provide the compute capacity used in the cluster 146 (e.g., instances 152) using the services provided by a compute service (not illustrated in FIG. 1) of the cloud provider network 120. Such a compute service may include one or more servers which provide resizable computing capacity to users for building and hosting their software systems. The compute service and associated control plane functionality can provide an elastic compute cloud service of the cloud provider network 120. Compute resources can be provided from the compute service to customers via an elastic compute cloud service (referred to in various implementations as an elastic compute service, a virtual machines service, a computing cloud service, a compute service, a compute engine, or a cloud compute service). Users can use the compute service to launch as many virtual computing environments, referred to as virtual compute instances, virtual machine instances, virtual machines, or collectively as "instances," as they need. Instances can have various configurations of processing power, memory, storage, and networking capacity depending upon user needs. The compute service can also include computer storage for temporary data used while an instance is running; however, as soon as the instance is shut down this data is lost.

The cloud provider network 120 may provide the instances (also referred to as virtual compute instances, compute instances, virtual machine instances, or virtual machines) shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Although the instances 152 are used as examples in FIG. 1, the compute resources usable by the clusters 146 and 170 include one or more of physical machines, virtual machines, containers, nodes, or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances, e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In addition to such internal compute capacity within the cloud provider network 120 (e.g., compute instances hosted by a set of physical machines owned and/or operated by the cloud provider network 120), the container service 140 may utilize external compute capacity hosted by infrastructure external to the cloud provider network 120, such as the instances 162A and 162B of the on-premises environment 130 as illustrated in FIG. 1. Similar to the instances 152, the instances 162 may include one or more of a virtual machine instance, a bare-metal instance, a physical machine, a container, a node, or an offload card.

The container service 140 may provide a set of application programming interfaces ("APIs") that can be used by the users of the user computing devices 102 to add, modify, or remove compute capacity to the clusters; and/or request execution of user applications (e.g., tasks) on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Further details regarding the container service 140 can be found within U.S. Pat. No. 9,256,467, entitled "SYSTEM FOR MANAGING AND SCHEDULING CONTAINERS" and filed Nov. 11, 2014, the entirety of which is hereby incorporated by reference.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. A cluster refers to a logical grouping of tasks. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 120 can deploy containers by managing clusters of compute instances that run container agents. As described herein, such compute instances can be implemented within the cloud provider network 120 or within the on-premises environment 130, and a cluster may include one or both types of such compute instances. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include object storage servers, block store servers, domain name services ("DNS") servers, relational database servers, file system servers, message queuing servers, logging servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable "virtual computing devices" via their use of the clusters 146 and 170 and/or the instances 152 and 162 illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services), file system services, message queuing services, logging services, and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for managing task executions using internal and external compute capacity can be implemented as part of a virtual compute service, container service, or Kubernetes-based container service in some embodiments.

Figure 2:
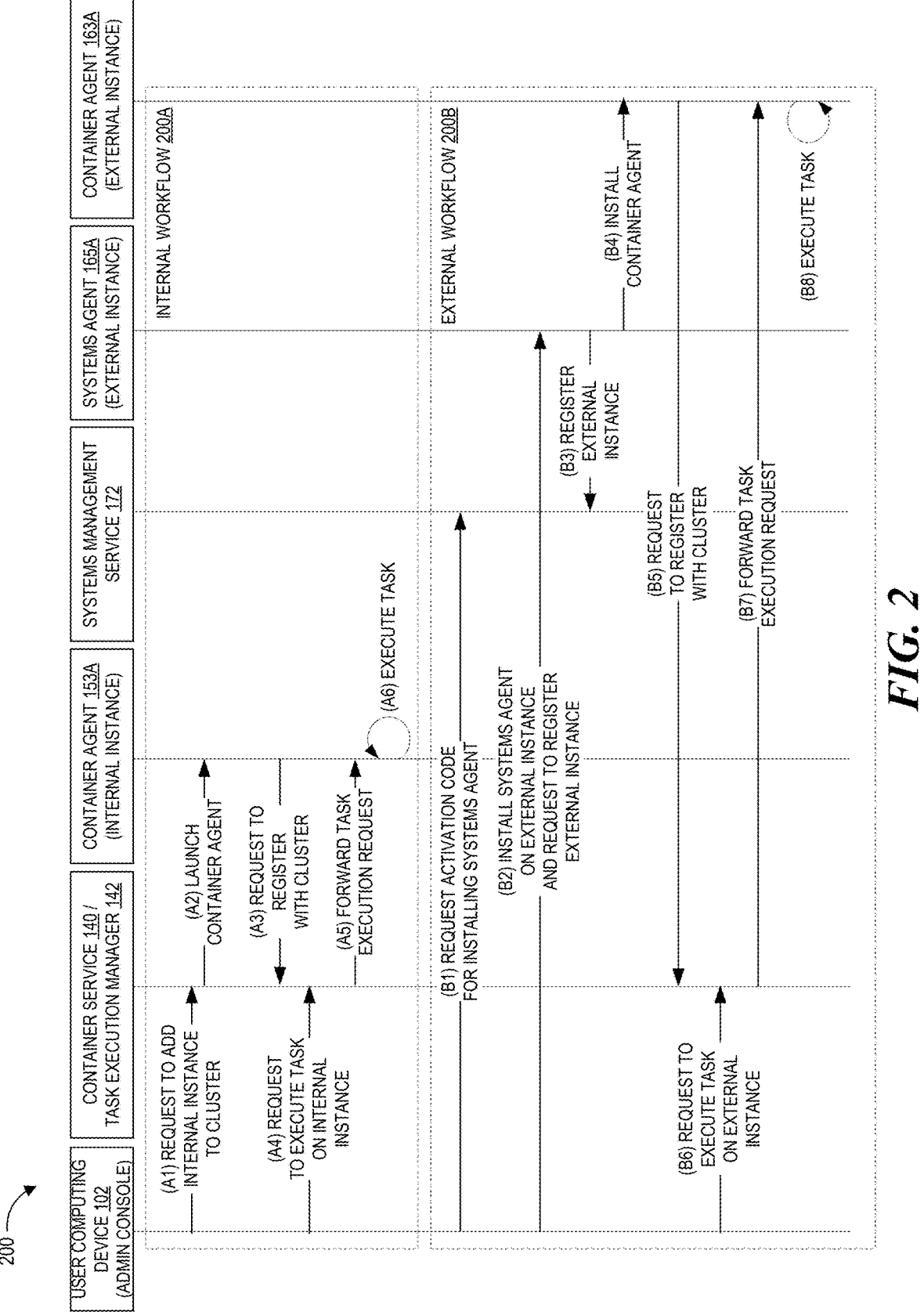
FIG. 2 is a workflow diagram illustrating the interactions between the various components of FIG. 1 for registering internal and external compute capacity and processing task execution requests using the added compute capacity, in accordance with aspects of the present disclosure.

Example Workflow for Registering Compute Capacity and Processing Task Execution Requests FIG. 2 depicts interactions among the various components shown in FIG. 1 for registering internal and external compute capacity and processing task execution requests using the added compute capacity, in accordance with aspects of the present disclosure. With reference to (A1)-(A6) of FIG. 2, an internal workflow 200A for registering an internal compute instance and executing a task on the internal compute instance are described. At (A1), the user computing device 102 calls an API provided by the container service 140 to request to add a compute instance (e.g., instance 152 of FIG. 1) to a cluster (e.g., cluster 146 of FIG. 1), where the compute instance and the cluster are both assigned to the user associated with the user computing device 102. At (A2), the container service 140 launches a container agent 153A on the instance. At (A3), the container agent 153A sends, to the container service 140 (or a control plane component thereof), a request to register itself with the cluster as available capacity.

At (A4), the user computing device 102 calls another API provided by the container service 140 to request to execute a task on an internal compute capacity in the cluster (e.g., by identifying the internal compute capacity provider), where the task includes a set of container images to be executed. At (A5), the container service 140 forwards the task execution request to the container agent 153A. In response, at (A6), the container agent 153A causes the container images to be executed on the internal compute instance.

With reference to (B1)-(B8), an external workflow 200B for registering an external compute instance and executing a task on the external compute instance are described. At (B1), the user computing device 102 calls an API provided by the systems management service 172 to obtain an activation ID (e.g., username) and an activation code (e.g., password) usable to register the external compute instance with the systems management service 172. At (B2), the user computing device 102 installs a systems agent 165A on the external compute instance (e.g., by downloading an installation package onto the external compute instance) and requests to register the external compute instance (e.g., instance 162A of FIG. 1) with the cloud provider network 120 (activation pair process→then SSM agent lands on the instance), made against. At (B3), the systems agent 165A registers the external instance with the systems management service 172 (e.g., using the activation ID and activation code obtained from the systems management service 172 at (B1)). At (B4), the systems agent 165A installs a container agent 163A on the external compute instance. At (B5), the container agent 163A sends, to the container service 140 (or a control plane component thereof), a request to register itself with the cluster as available capacity.

At (B6), the user computing device 102 calls another API provided by the container service 140 to request to execute a task on an external compute capacity in the cluster (e.g., by identifying the external compute capacity provider), where the task includes a set of container images to be executed. At (B7), the container service 140 forwards the task execution request to the container agent 163A. In response, at (B8), the container agent 163A causes the container images to be executed on the external compute instance.

As illustrated, a component of the cloud provider network 120 is able to enable and manage execution of tasks across both internal and external compute capacity, thereby reducing operational overhead and providing uniformity across all environments (e.g., same control plane, same APIs, etc.). Although (A1)-(A6) and (B1)-(B8) are both shown in FIG. 2, the two workflows do not depend on each other and need to be performed sequentially or together. In some embodiments, only the external workflow 200B is performed, and in other embodiments, only the internal workflow 200A is performed.

Example Routine for Processing a Task Execution Request

FIG. 3 depicts an illustrative routine 300 for processing a task execution request in accordance with aspects of the present disclosure. The routine 300 may be carried out, for example, by the container service 140 (or a component thereof such as the task execution manager 142 or the capacity provider 148) or one or more other components of the cloud provider network 120 described herein. For convenience, some or all of the steps of the routine 300 are described as being performed by the task execution manager 142. For example, the task execution manager 142 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the task execution manager 142 receives a request to execute a task. The request may identify the cluster in which the task is to be executed and the capacity provider to be used to provide the compute capacity usable to execute the task. Additionally, the request may include a task definition indicating the one or more container images needed to execute the task and one or more computing resource requirements associated with the task. Although the example of FIG. 3 illustrates processing a single task execution request, in some embodiments, the container service 140 may receive a group of requests with an indication of how the requests should be distributed across the capacity providers associated with the cluster (as described in greater detail below with reference to FIG. 5).

At block 304, the task execution manager 142, based on the request, determines the capacity provider to be used to execute the task. The task execution manager 142 may manage multiple capacity providers that are each configured to provide compute capacity of a different type. For example, one capacity provider may provide internal compute capacity including compute instances obtained or obtainable from an instance provisioning service of the cloud provider network 120 and/or a serverless code execution service of the cloud provider network 120, and another capacity provider may provide external compute capacity including compute instances hosted on hardware that is owned and/or operated by the user associated with the cluster (e.g., instances 162 in the on-premises environment 130 of FIG. 1). The cluster may be associated with multiple capacity providers for providing different types of internal compute capacity, and/or associated with multiple capacity providers for providing different types of external compute capacity.

At block 306, if the task execution manager 142 determines that an external capacity provider is not to be used to execute the task, the routine 300 proceeds to block 308. If the task execution manager 142 determines that an external capacity provider is to be used to execute the task, the routine 300 proceeds to block 312.

At block 308, the task execution manager 142 identifies an internal compute instance usable to execute the task. For example, the task execution manager 142 may determine the execution requirements associated with the task (e.g., amount of computing resources, instance type, etc.) and identify one of the internal compute instances in the cluster. At block 310, the task execution manager 142 causes the task to be executed on the identified internal compute instance. The routine 300 may then end.

At block 312, the task execution manager 142 identifies an external compute instance usable to execute the task. For example, the task execution manager 142 may determine the execution requirements associated with the task (e.g., amount of computing resources, instance type, etc.) and identify one of the external compute instances in the cluster. At block 314, the task execution manager 142 causes the task to be executed on the identified external compute instance. For example, the task execution manager 142 may output an instruction to execute the task to the container agent 163A running on the identified external compute instance. The routine 300 may then end.

The routine 300 can include fewer, more, or different blocks than those illustrated in FIG. 3 and/or one or more blocks illustrated in FIG. 3 may be modified, omitted, or switched without departing from the spirit and scope of the description. For example, in some embodiments, the amount of information available to the task execution manager 142 about the internal compute instances may be different from the amount of information available to the task execution manager 142 about the external compute instances. In such embodiments, the amount of information that the task execution manager 142 uses to place incoming tasks onto the internal instances (e.g., at block 308) may be different from that used to place incoming tasks onto the external instances (e.g., at block 312). In some embodiments, where the task execution manager 142 has more information about the internal instances, the user of the external instances may provide the missing information (e.g., information about the external instances that is not otherwise available to the task execution manager 142) to the task execution manager 142 so that the same amount or type of information can be used for placing incoming tasks onto both internal and external instances. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Transitioning from External to Internal Compute Capacity

Figure 4:
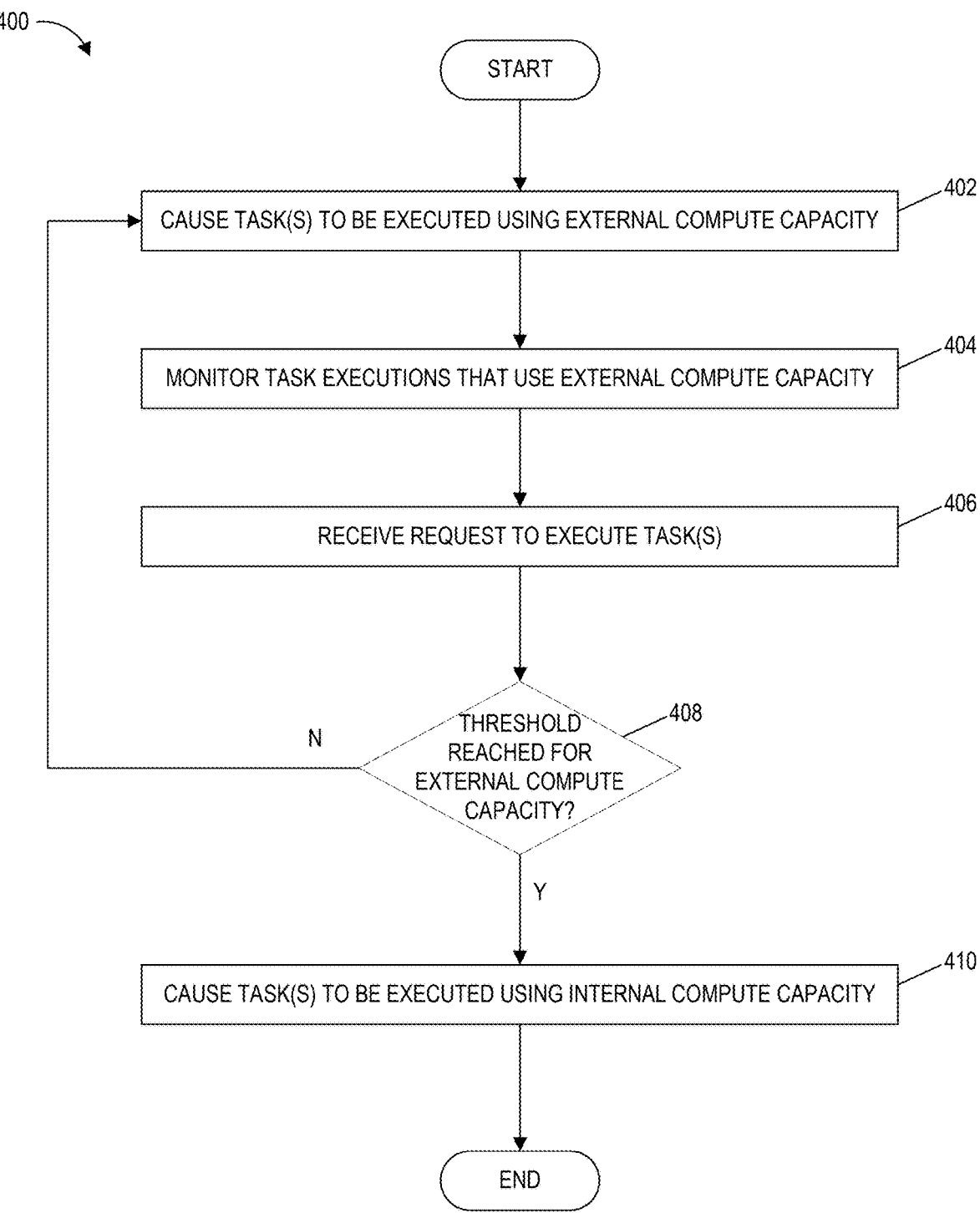
FIG. 4 is a flowchart of an example process for transitioning from external compute capacity to internal compute capacity in accordance with aspects of the present disclosure.

FIG. 4 depicts an illustrative routine 400 for transitioning from external compute capacity to internal compute capacity in accordance with aspects of the present disclosure. The routine 400 may be carried out, for example, by the container service 140 (or a component thereof such as the task execution manager 142 or the capacity provider 148) or one or more other components of the cloud provider network 120 described herein. For convenience, some or all of the steps of the routine 400 are described as being performed by the task execution manager 142. For example, the task execution manager 142 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the task execution manager 142 causes one or more tasks to be executed using external compute capacity. For example, a user may wish to utilize the user's own infrastructure to the extent possible and burst to the compute capacity provided by the cloud provider network 120 only when the user's own infrastructure is full or otherwise unavailable. In such an example, the task execution manager 142 may continue to process incoming code execution requests using the user's external compute capacity as long as such capacity is available.

At block 404, the task execution manager 142 monitors the task executions on the external compute capacity. For example, the task execution manager 142 may receive information about the health of the compute instances, about which tasks are running on which compute instances, about how much computing resources are available on the compute instances, etc. from the external compute instances running in the on-premises environment 130. In the event that network connectivity is lost between the task execution manager 142 and the container agent running on the external compute capacity, the tasks currently running on the external compute capacity may continue running, and the task execution manager 142 treat the external compute capacity as being unavailable and direct task execution requests to the internal compute capacity at least for the duration of the outage.

At block 406, the task execution manager 142 receives a request to execute one or more tasks. The request may identify the cluster in which the task is to be executed and the capacity provider to be used to provide the compute capacity usable to execute the task and/or identify a task execution rule according to which the task should be routed to one of the capacity providers. Additionally, the request may include a task definition indicating the one or more container images needed to execute the task and one or more computing resource requirements associated with the task.

At block 408, the task execution manager 142 determines whether the task execution on the external compute capacity has reached a threshold level for transitioning to internal compute capacity. For example, the user may have configured the task execution manager 142 to send the first 50 tasks to the external compute instances in the cluster, and send any subsequent tasks to the internal compute instances in the cluster. If the task execution manager 142 determines that the threshold of 50 tasks has been reached, the task execution manager 142 may determine that the threshold level has been reached.

If the task execution manager 142 determines that the task execution on the external compute capacity has not reached the threshold level, the routine 400 proceeds to block 402 to continue executing tasks using external compute capacity. Otherwise, the routine 400 proceeds to block 410, where the task execution manager 142 causes the tasks to be executed using internal compute capacity. The routine 400 may then end. In some embodiments, the routine 400 may proceed to block 404 to continue monitoring the task executions and process incoming task execution requests.

The routine 400 can include fewer, more, or different blocks than those illustrated in FIG. 4 and/or one or more blocks illustrated in FIG. 4 may be modified, omitted, or switched without departing from the spirit and scope of the description. For example, although the routine 400 illustrates transitioning from external compute capacity to internal compute capacity, in other embodiments, the techniques described herein can be used to transition from internal compute capacity to external compute capacity (e.g., by switching "internal" and "external" in the routine 400). Moreover, it will be appreciated by those skilled in the art and others that some or all of the functions described in this disclosure may be embodied in software executed by one or more processors of the cloud provider network 120 and/or the user computing device 102 disclosed herein.

Figure 5:
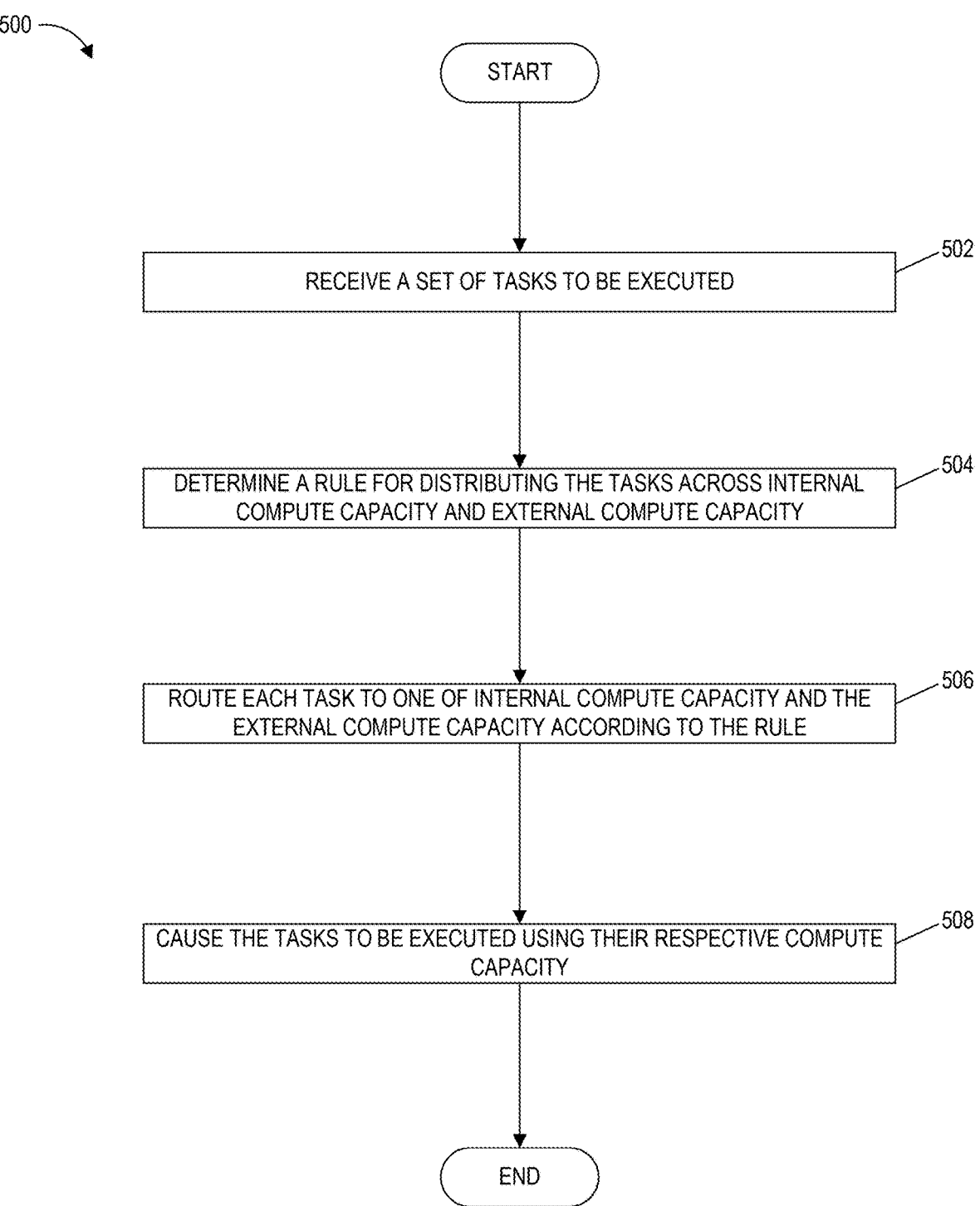
FIG. 5 is a flowchart of an example process for distributing tasks across internal and external compute capacity in accordance with aspects of the present disclosure.

Example Routine for Distributing Tasks Across Internal and External Compute Capacity FIG. 5 depicts an illustrative routine 500 for distributing tasks across internal and external compute capacity in accordance with aspects of the present disclosure. The routine 500 may be carried out, for example, by the container service 140 (or a component thereof such as the task execution manager 142 or the capacity provider 148) or one or more other components of the cloud provider network 120 described herein. For convenience, some or all of the steps of the routine 500 are described as being performed by the task execution manager 142. For example, the task execution manager 142 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the task execution manager 142 receives a set of tasks to be executed in a cluster associated with a user.

At block 504, the task execution manager 142 determines a task execution rule for distributing the tasks across internal compute capacity and external compute capacity. For example, the user may have configured the task execution manager 142 or the cluster associated with the user to distribute incoming task execution requests based on certain base values, ratios, and/or conditions (e.g., price, resource cost, and/or current demand associated with using an internal compute instance). For example, as described above, the rule associated with the request and/or the cluster may indicate that the first 50 tasks should be sent to the external compute instances in the cluster, and any subsequent tasks should be sent to the internal compute instances in the cluster. As another example, the rule associated with the request and/or the cluster may indicate that the incoming task execution requests should be split across the available capacity providers (e.g., an internal capacity provider and an external capacity provider) evenly (e.g., 50:50). In yet another example, the rule associated with the request and/or the cluster may indicate that the incoming task execution requests should be split across a subset (but not all) of the capacity providers according to a specific ratio (e.g., 30:70, or 30:30:40). In yet another example, the rule may indicate that an internal instance should be used unless the cost (e.g., resource cost, price, or current level of demand) associated with doing so would exceed a threshold value.

At block 506, the task execution manager 142 routes each task to one of internal compute capacity and external compute capacity according to the rule. For example, if the rule indicates that the incoming task execution requests should be distributed evenly, the task execution manager 142 may route half of the tasks to the internal compute capacity manager, and the other half of the tasks to the external compute capacity manager.

At block 514, the task execution manager 142 causes the tasks to be executed using their respective compute capacity. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Container Service

Figure 6:
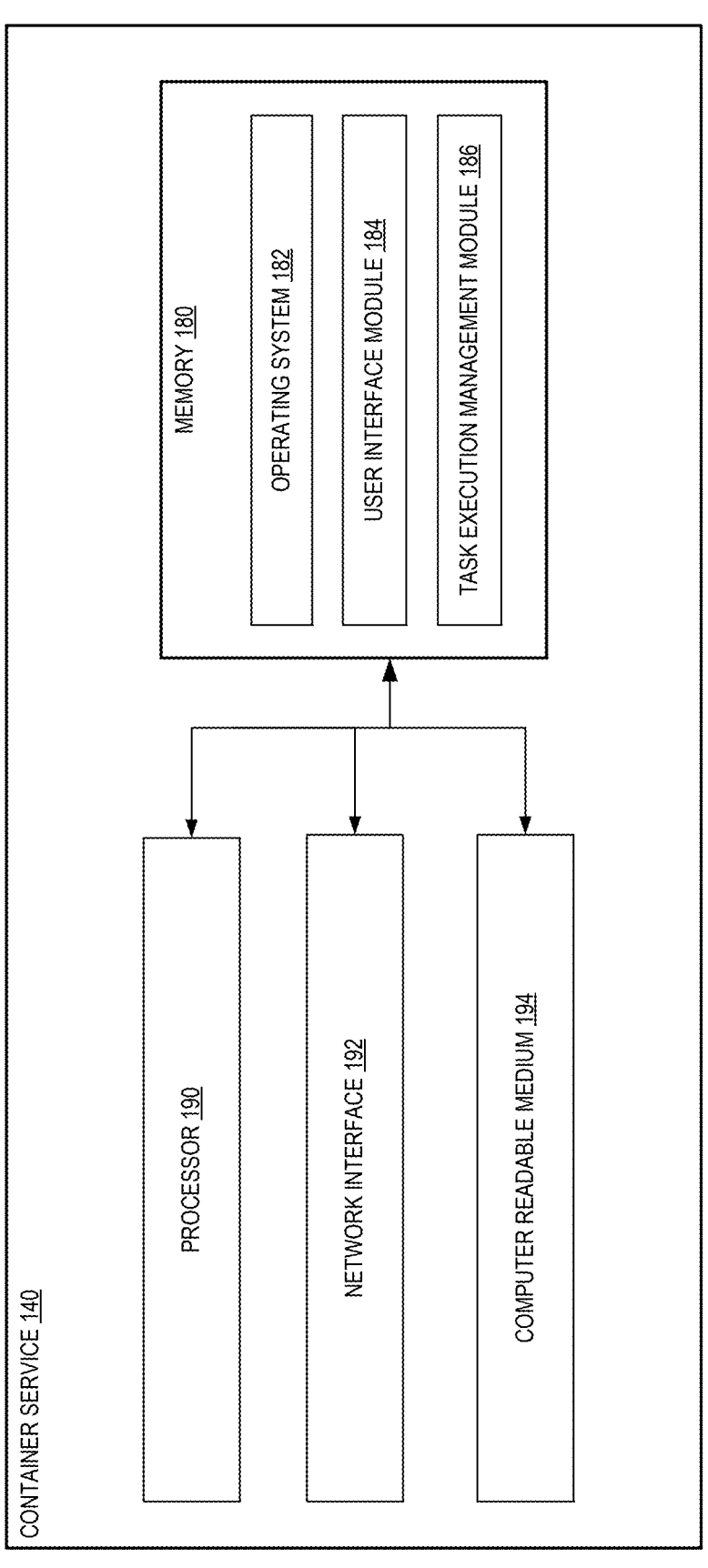
FIG. 6 depicts a general architecture of a computing device or system providing a container service in accordance with aspects of the present disclosure.

FIG. 6 depicts an example architecture of a computing system (referred to as the container service 140) that can be used to perform one or more of the techniques described herein or illustrated in FIGS. 1-5. The general architecture of the container service 140 depicted in FIG. 6 includes an arrangement of computer hardware and software modules that may be used to implement one or more aspects of the present disclosure. The container service 140 may include many more (or fewer) elements than those shown in FIG. 6. It is not necessary, however, that all of these elements be shown in order to provide an enabling disclosure. As illustrated, the container service 140 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the container service 140. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a task execution management module 186 that may be executed by the processor 190. In one embodiment, the task execution management module 186 implements various aspects of the present disclosure, e.g., those illustrated in FIGS. 1-5 or described with reference to FIGS. 1-5.

While the task execution management module 186 is shown in FIG. 6 as part of the container service 140, in other embodiments, all or a portion of the task execution module 186 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the container service 140. It will also be appreciated that, in some embodiments, a user computing device (e.g., the user computing device 102 of FIG. 1) may implement functionality that is otherwise described herein as being implemented by the elements and/or modules of the container service 140. For example, the user computing device 102 may receive code modules or other instructions from the container service 140 and/or other components of the cloud provider network 120 via the network 104 that are executed by the user computing device 102 to implement various aspects of the present disclosure.

Although a single processor, a single network interface, a single computer-readable medium, and a single memory are illustrated in the example of FIG. 6, in other implementations, the container service 140 can have a multiple of one or more of these components (e.g., two or more processors and/or two or more memories).

Enumerated Implementations (EIs)

Some examples of enumerated implementations (EIs) are provided in this section, without limitation.

EI 1: A cloud provider system comprising: a first set of physical machines hosting internal compute capacity comprising a plurality of compute instances usable to execute tasks; a set of capacity providers associated with a cluster of compute capacity and configured to provide compute capacity to the cluster for executing tasks in the cluster, wherein the set of capacity providers includes (i) a first capacity provider for providing internal compute capacity hosted by the first set of physical machines of the cloud provider system, and (ii) a second capacity provider for providing external compute capacity hosted by a second set of physical machines external to the cloud provider system; and a container service comprising computer hardware, wherein the container service is configured to at least: receive, from a user computing device, a first request to execute a first task in the cluster, wherein the first request includes a first capacity provider identifier; determine, based at least in part on the first capacity provider identifier, that the first capacity provider of the set of capacity providers is to be used to execute the first task; cause the first task to be executed using a first compute instance of the plurality of compute instances that is associated with the first capacity provider and hosted by the first set of physical machines of the cloud provider system; receive, from the user computing device, a second request to execute a second task in the cluster, wherein the second request includes a second capacity provider identifier; determine, based at least in part on the second capacity provider identifier, that the second capacity provider of the set of capacity providers is to be used to execute the second task; and cause the second task to be executed using a second compute instance hosted on or across the second set of physical machines external to the cloud provider system.

EI 2: The cloud provider system of EI 1, wherein the first compute instance is associated with the cluster prior to the first request being received.

EI 3: The cloud provider system of EI 1, wherein the first compute instance is acquired by the first capacity provider subsequent to the first request being received.

EI 4: The cloud provider system of EI 1, wherein the container service is further configured to distribute incoming task execution requests across the first capacity provider and the second capacity provider according to a task execution rule associated with the cluster.

EI 5: A computer-implemented method comprising: receiving, by a container service implemented by a cloud provider system, a first request to execute a first task in a cluster of compute capacity; determining, by the container service, that the first task is to be executed using internal compute capacity hosted by a first set of physical machines of the cloud provider system implementing the container service; executing the first task on a first compute instance hosted by the first set of physical machines of the cloud provider system; receiving, by the container service, a second request to execute a second task in the cluster of compute capacity; determining, by the container service, that the second task is to be executed using external compute capacity hosted by a second set of physical machines external to the cloud provider system; and outputting an instruction to execute the second task on a second compute instance hosted by the second set of physical machines external to the cloud provider system.

EI 6: The computer-implemented method of EI 5, wherein the first compute instance is associated with the cluster prior to the first request being received.

EI 7: The computer-implemented method of EI 5, wherein the first compute instance is acquired by the first capacity provider subsequent to the first request being received.

EI 8: The computer-implemented method of EI 5, further comprising distributing incoming task execution requests across the internal compute capacity and the external compute capacity according to a task execution rule associated with the cluster.

EI 9: The computer-implemented method of EI 5, further comprising determining that the first task is to be executed using internal compute capacity based at least in part on a usage of the internal compute capacity in the cluster having reached a threshold level.

EI 10: The computer-implemented method of EI 5, wherein the first request includes a first indicator indicating that the first task is to be executed using internal compute capacity, and the second request includes a second indicator indicating that the second task is to be executed using external compute capacity.

EI 11: The computer-implemented method of EI 5, wherein the first request includes an indicator indicating that the first task is to be executed using internal compute capacity that satisfies a first execution requirement, the method further comprising identifying the first compute instance in the cluster based at least in part on the first compute instance satisfying the first execution requirement.

EI 12: The computer-implemented method of EI 5, wherein the first compute instance is one of a virtual machine instance, a bare-metal instance, a physical machine, a container, a node, or an offload card.

EI 13: A non-transitory computer-readable medium storing instructions that, when executed by a computing system within a cloud provider network, cause the computing system to perform operations comprising: receiving a first request to execute a first task in a cluster of compute capacity; determining that the first task is to be executed using internal compute capacity hosted by a first set of physical machines within the cloud provider network; executing the first task on a first compute instance hosted by the first set of physical machines within the cloud provider network; receiving a second request to execute a second task in the cluster of compute capacity; determining that the second task is to be executed using external compute capacity hosted by a second set of physical machines external to the cloud provider network; and outputting an instruction to execute the second task on a second compute instance hosted by the second set of physical machines external to the cloud provider network.

EI 14: The non-transitory computer-readable medium of EI 13, wherein the first compute instance is associated with the cluster prior to the first request being received.

EI 15: The non-transitory computer-readable medium of EI 13, wherein the first compute instance is acquired by the first capacity provider subsequent to the first request being received.

EI 16: The non-transitory computer-readable medium of EI 13, storing further instructions that, when executed by the computing system, cause the computing system to perform operations comprising distributing incoming task execution requests across the internal compute capacity and the external compute capacity according to a task execution rule associated with the cluster.

EI 17: The non-transitory computer-readable medium of EI 13, storing further instructions that, when executed by the computing system, cause the computing system to perform operations comprising determining that the first task is to be executed using internal compute capacity based at least in part on a usage of the internal compute capacity in the cluster having reached a threshold level.

EI 18: The non-transitory computer-readable medium of EI 13, wherein the first request includes a first indicator indicating that the first task is to be executed using internal compute capacity, and the second request includes a second indicator indicating that the second task is to be executed using external compute capacity.

EI 19: The non-transitory computer-readable medium of EI 13, wherein the first request includes an indicator indicating that the first task is to be executed using internal compute capacity that satisfies a first execution requirement, the non-transitory computer-readable medium storing further instructions that, when executed by the computing system, cause the computing system to perform operations comprising identifying the first compute instance in the cluster based at least in part on the first compute instance satisfying the first execution requirement.

EI 20: The non-transitory computer-readable medium of EI 13, wherein the first compute instance is one of a virtual machine instance, a bare-metal instance, a physical machine, a container, a node, or an offload card.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could." "might." "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including." "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X. Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:

a first set of physical machines hosting internal compute capacity comprising a plurality of compute instances usable to execute tasks;

a set of capacity providers associated with a cluster of compute capacity and configured to provide compute capacity to the cluster for executing tasks in the cluster, wherein the set of capacity providers includes (i) a first capacity provider for providing internal compute capacity hosted by the first set of physical machines of the cloud provider system, and (ii) a second capacity provider for providing external compute capacity hosted by a second set of physical machines external to the cloud provider system; and a container service comprising computer hardware, wherein the container service is configured to at least:

receive, from a user computing device, one or more threshold values, ratios, or conditions usable to load balance incoming task execution requests across the internal compute capacity hosted by the first set of physical machines and the external compute capacity hosted by the second set of physical machines external to the cloud provider system, wherein the one or more threshold values, ratios, or conditions comprise a ratio of task execution requests to be maintained across the set of capacity providers such that the incoming task execution requests are split across the external compute capacity and the internal compute capacity in a way that maintains the ratio;

configure, using the one or more threshold values, ratios, or conditions, the cluster of compute capacity to load balance the incoming task execution requests across the internal compute capacity and the external compute capacity based at least in part on the one or more threshold values, ratios, or conditions;

subsequent to the configuration of the cluster, receive a first request to execute a first task in the cluster;

determine, based at least in part on the one or more threshold values, ratios, or conditions used to configure the cluster and one or more historical or current values, ratios, or conditions associated with the cluster, that the internal compute capacity provided by the first capacity provider of the set of capacity providers is to be used to execute the first task;

cause the first task to be executed using a first compute instance of the plurality of compute instances that is associated with the first capacity provider and hosted by the first set of physical machines of the cloud provider system;

receive a second request to execute a second task in the cluster;

determine, based at least in part on the one or more threshold values, ratios, or conditions used to configure the cluster and one or more updated historical or current values, ratios, or conditions associated with the cluster, that the external compute capacity provided by the second capacity provider of the set of capacity providers is to be used to execute the second task; and cause the second task to be executed using a second compute instance hosted on or across the second set of physical machines external to the cloud provider system.

2. The cloud provider system of claim 1, wherein the first compute instance is associated with the cluster prior to the first request being received.

3. The cloud provider system of claim 1, wherein the first compute instance is acquired by the first capacity provider subsequent to the first request being received.

4. The cloud provider system of claim 1, wherein the container service is further configured to provide an application programming interface (API) usable to create a new rule or modify or delete an existing rule for load balancing incoming task execution requests across the first capacity provider and the second capacity provider.

5. A computer-implemented method comprising:

providing a cluster of compute capacity and a set of capacity providers configured to provide compute capacity to the cluster for executing tasks in the cluster;

receiving, from a user computing device, one or more threshold values, ratios, or conditions usable to load balance incoming task execution requests across internal compute capacity hosted by a first set of physical machines of a cloud provider system and external compute capacity hosted by a second set of physical machines external to the cloud provider system, wherein the one or more threshold values, ratios, or conditions comprise a ratio of task execution requests to be maintained across the set of capacity providers such that the incoming task execution requests are split across the external compute capacity and the internal compute capacity in a manner that maintains the ratio;

configuring, using the one or more threshold values, ratios, or conditions, the cluster of compute capacity to load balance the incoming task execution requests across the internal compute capacity and the external compute capacity based at least in part on the one or more threshold values, ratios, or conditions;

subsequent to the configuration of the cluster, receiving, by a container service implemented by the cloud provider system, a first request to execute a first task in the cluster of compute capacity;

determining, by the container service and based at least in part on the one or more threshold values, ratios, or conditions used to configure the cluster and one or more historical or current values, ratios, or conditions associated with the cluster, that internal compute capacity hosted by a first set of physical machines of the cloud provider system implementing the container service is to be used to execute the first task;

executing the first task on a first compute instance hosted by the first set of physical machines of the cloud provider system;

receiving, by the container service, a second request to execute a second task in the cluster of compute capacity;

determining, by the container service and based at least in part on the one or more threshold values, ratios, or conditions used to configure the cluster and one or more updated historical or current values, ratios, or conditions associated with the cluster, that external compute capacity hosted by a second set of physical machines external to the cloud provider system is to be used to execute the second task; and outputting an instruction to execute the second task on a second compute instance hosted by the second set of physical machines external to the cloud provider system.

6. The computer-implemented method of claim 5, wherein the first compute instance is associated with the cluster prior to the first request being received.

7. The computer-implemented method of claim 5, wherein the first compute instance is acquired by the first capacity provider subsequent to the first request being received.

8. The computer-implemented method of claim 5, further comprising providing an application programming interface (API) usable to create a new rule or modify or delete an rule for load balancing incoming task execution requests across the internal compute capacity and the external compute capacity.

9. The computer-implemented method of claim 5, further comprising determining that the first task is to be executed using internal compute capacity based at least in part on a usage of the internal compute capacity in the cluster having reached a threshold level.

10. The computer-implemented method of claim 5, wherein the first request includes a first indicator indicating that the first task is to be executed using internal compute capacity, and the second request includes a second indicator indicating that the second task is to be executed using external compute capacity.

11. The computer-implemented method of claim 5, wherein the first request includes an indicator indicating that the first task is to be executed using internal compute capacity that satisfies a first execution requirement, the method further comprising identifying the first compute instance in the cluster based at least in part on the first compute instance satisfying the first execution requirement.

12. The computer-implemented method of claim 5, wherein the first compute instance is one of a virtual machine instance, a bare-metal instance, a physical machine, a container, a node, or an offload card.

13. A non-transitory computer-readable medium storing instructions that, when executed by a computing system within a cloud provider network, cause the computing system to perform operations comprising:

providing a cluster of compute capacity and a set of capacity providers configured to provide compute capacity to the cluster for executing tasks in the cluster;

receiving, from a user computing device, one or more threshold values, ratios, or conditions usable to load balance incoming task execution requests across internal compute capacity hosted by a first set of physical machines of a cloud provider system and external compute capacity hosted by a second set of physical machines external to the cloud provider system, wherein the one or more threshold values, ratios, or conditions comprise a ratio of task execution requests to be maintained across the set of capacity providers such that the incoming task execution requests are split across the external compute capacity and the internal compute capacity in a manner that maintains the ratio;

configuring, using the one or more threshold values, ratios, or conditions, the cluster of compute capacity to load balance the incoming task execution requests across the internal compute capacity and the external compute capacity based at least in part on the one or more threshold values, ratios, or conditions;

subsequent to the configuration of the cluster, receiving a first request to execute a first task in the cluster of compute capacity;

determining, based at least in part on the one or more threshold values, ratios, or conditions used to configure the cluster and one or more historical or current values, ratios, or conditions associated with the cluster, that internal compute capacity hosted by a first set of physical machines within the cloud provider network is to be used to execute the first task;

executing the first task on a first compute instance hosted by the first set of physical machines within the cloud provider network;

receiving a second request to execute a second task in the cluster of compute capacity;

determining, based at least in part on the one or more threshold values, ratios, or conditions used to configure the cluster and one or more updated historical or current values, ratios, or conditions associated with the cluster, that external compute capacity hosted by a second set of physical machines external to the cloud provider network is to be used to execute the second task; and outputting an instruction to execute the second task on a second compute instance hosted by the second set of physical machines external to the cloud provider network.

14. The non-transitory computer-readable medium of claim 13, wherein the first compute instance is associated with the cluster prior to the first request being received.

15. The non-transitory computer-readable medium of claim 13, wherein the first compute instance is acquired by the first capacity provider subsequent to the first request being received.

16. The non-transitory computer-readable medium of claim 13, storing further instructions that, when executed by the computing system, cause the computing system to perform operations comprising providing an application programming interface (API) usable to create a new rule or modify or delete an existing rule for load balancing incoming task execution requests across the internal compute capacity and the external compute capacity according to a task execution rule associated with the cluster.

17. The non-transitory computer-readable medium of claim 13, storing further instructions that, when executed by the computing system, cause the computing system to perform operations comprising determining that the first task is to be executed using internal compute capacity based at least in part on a usage of the internal compute capacity in the cluster having reached a threshold level.

18. The non-transitory computer-readable medium of claim 13, wherein the first request includes a first indicator indicating that the first task is to be executed using internal compute capacity, and the second request includes a second indicator indicating that the second task is to be executed using external compute capacity.

19. The non-transitory computer-readable medium of claim 13, wherein the first request includes an indicator indicating that the first task is to be executed using internal compute capacity that satisfies a first execution requirement, the non-transitory computer-readable medium storing further instructions that, when executed by the computing system, cause the computing system to perform operations comprising identifying the first compute instance in the cluster based at least in part on the first compute instance satisfying the first execution requirement.

20. The non-transitory computer-readable medium of claim 13, wherein the first compute instance is one of a virtual machine instance, a bare-metal instance, a physical machine, a container, a node, or an offload card.

21. The cloud provider system of claim 1, wherein the external compute capacity belongs to a user associated with the user computing system.

22. The computer-implemented method of claim 5, wherein the external compute capacity belongs to a user associated with the user computing system.

23. The non-transitory computer-readable medium of claim 13, wherein the external compute capacity belongs to a user associated with the user computing system.

24. The cloud provider system of claim 1, wherein the one or more threshold values, ratios, or conditions further comprise a threshold resource cost such that a task execution request associated with a resource cost that exceeds the threshold resource cost is to be routed to the external compute capacity as opposed to the internal compute capacity.

25. The cloud provider system of claim 1, wherein the one or more threshold values, ratios, or conditions further comprise a threshold number of task execution requests to be reached before transitioning from routing task execution requests to the external compute capacity to routing them to the internal compute capacity.

* * * * *